(No Model.)
S. C. C. CURRIE.
ELECTRIC MOTOR APPARATUS.
No. 431,649. Patented July 8, 1890.
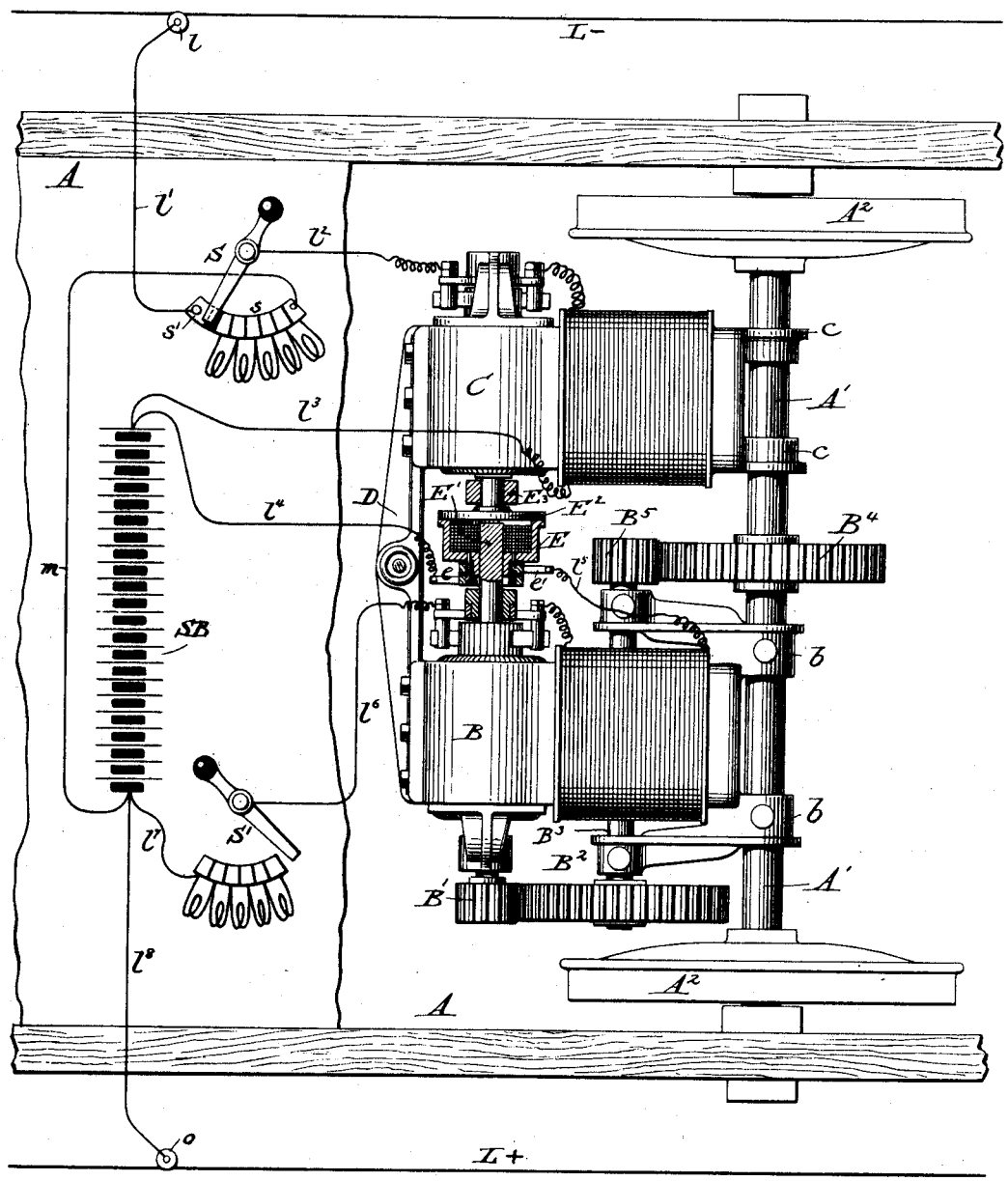
Witnesses
Baltus DeJong
Robt. W. Abert
Inventor
Stanley C. C. Currie
By his Attorneys
Baldwin, Davidson & Wight

UNITED STATES PATENT OFFICE.

STANLEY C. C. CURRIE, OF PHILADELPHIA, PENNSYLVANIA, ASSIGNOR TO THE UNITED GAS IMPROVEMENT COMPANY, OF SAME PLACE.

ELECTRIC-MOTOR APPARATUS.

SPECIFICATION forming part of Letters Patent No. 431,649, dated July 8, 1890.

Application filed April 11, 1890. Serial No. 347,461. (No model.)

*To all whom it may concern:*

Be it known that I, STANLEY C. C. CURRIE, a subject of the Queen of Great Britain, at present residing in Philadelphia, State of Pennsylvania, have invented certain new and useful Improvements in Electric-Motor Apparatus, of which the following is a specification.

My invention is more especially designed for use upon electric-motor cars.

Generally the invention involves two main features co-operating and in one sense mutually dependent upon each other, but each, broadly considered, not being necessarily dependent upon the other. These general features are—

First. An organization of motors and a storage-battery in which the battery may be charged from an outside source, (in the case of a street-car by means of overhead or conduit wires, in connection with a main generating-station,) the arrangement being such that the excessive variations of current required by the motor or motors is mainly supplied by the storage-battery, which at other times is being continuously charged from the outside source of electrical energy. Thus when the load is light the batteries are being charged, while on the other hand when the load is heavy the batteries are discharging and assisting the current from the outside source in the coils of the motor.

Second. I provide an arrangement by which I obtain an increased power and efficiency when the greatest amount of power is required, and when, as ordinarily arranged, the motors have their least efficiency—that is, upon the starting of the car.

My invention is fully set forth in the following specification and the drawing which illustrates one embodiment or practical organization of my ideas.

The drawing is a bottom diagrammatic view of a section of a car-body A, showing one axle A' and driving and carrying wheels $A^2 A^2$. Two motors B C are swung at $b\, b$ and $c\, c$ upon the axle A'. At their opposite ends the field-poles are bolted to a frame D, which is secured to the under side of a car-body. The armature-shaft of the motor B carries a pinion B', working in a gear $B^2$ on a shaft $B^3$, and a gear $B^5$ on this shaft gears with a cog $B^4$ on the car-axle. The shafts of the armatures of the two motors B C are in line with each other, and between the two shafts a clutch mechanism is provided for locking them together. I have shown an electro-magnetic clutch device, and when I use a clutch of that character I preferably construct it in the following manner:

Upon the end of the armature-shaft of the motor B, I provide an electro-magnet with two cores, the outer one E being in the form of a hollow cylinder, and the inner one E' solid, the wire being wound between the two. In the drawing the inner core E' is shown as formed by the end of the armature-shaft, while the outer cup-shaped or cylindrical casing or core is secured to the armature-shaft. The armature $E^2$ for this magnet consists of a plate or disk mounted upon the end of the shaft of the motor C and presses only upon the outer core, or, in other words, upon the edge of the cylinder E, the inner core E' being a trifle shorter to prevent contact with the armature $E^2$.

The armature $E^2$ may have a slight play upon the end of the motor C; or the shaft itself may have a slight endwise motion in its bearing $E^3$. The current is led to the coil of the magnet E E' through brushes $e\, e'$, bearing, respectively, upon insulated rings mounted upon a hub, carried by the cylinder E, and with which the terminals of the coil of the magnet are connected, as plainly indicated in the drawing. The organization thus far described is a suitable one for practicing my invention; but I do not wish to be understood as limiting the invention to this special construction.

S B represents a storage-battery. (Shown as carried within the car.) L + and L − represent the leads from a source of electric energy. The current is taken from the lead L − by a wheel or rubber $l$ and line $l'$ to the contact $s'$ of a switch S, through lever of switch and conductor $l^2$ to the motor C, which may be of any ordinary character. From the motor the circuit passes by line $l^3$ to one pole of the storage-battery S B. From the conductor $l^3$, or from this same pole of the storage-battery, a wire $l^4$ runs to the brush $e$, through the electro-magnetic clutch-coil, and out by brush $e'$, and by wire $l^5$, through the motor B, and thence by wire $l^6$ to the lever of a resistance-switch S', the contacts of which are connected by a line $l^7$ with the opposite end of the storage-battery S B, this pole of the battery being connected through line $l^8$ with a suitable rubber or roller $o$, bearing on the lead L + of the outside circuit. This same pole of the storage-battery is connected by a wire $m$ with the end contact-plate of the resistance-switch S. The lever of the switch S being upon the contact $s'$, the current from L − passes to the switch-lever, and by line $l^2$, through the motor C, to the storage-battery. The current will therefore be constantly running through the motor C and through the storage-battery, the result being that the former is revolved and the battery charged. If the car is at rest, the motor C, being without a load, will revolve at a very high speed, and in doing so will increase the opposing electro-motive force between the end of the battery and the line L −. A small current will therefore be running into and charging the battery. On starting the car the switch S' is turned so as to allow a current to pass through the motor B, and the electro-magnetic clutch E E', being in circuit $l^4$ from the storage-battery and from line $l^3$, the clutch-magnet attracts its armature $E^2$, which is revolving at a high rate of speed. The result is the motor B is actuated by the current flowing in its circuit $l^4$ $l^5$ $l^6$, and at the same time the armature-shaft of the motor C, which is running at very high speed, is by gradually-increasing friction of the clutch locked with the armature of the shaft B, and the full power of the motor C, which is then running at its greatest efficiency, will assist the motor B in starting the car or performing the work to be done. As the speed of the motor C is gradually decreased, the current through this motor will be relatively increased, and the two motors will consequently assist each other and eventually run together at the same speed. Upon slowing down, the current in the motor B may be decreased by the manipulation of the resistance switch S', and finally cut off altogether by the opening of that switch, and when this occurs the clutch-magnet releases its armature, and the motor C again runs up to its fullest speed without any load and continues to effect the charging of the storage-battery. By placing the lever of the switch S upon any one of the contacts $s$ of the resistance-switch, obviously the motor C will be included in a circuit running from the storage-battery only. Both motors B C would then be in parallel and both run from the storage-battery only. This arrangement of circuits, switches, &c., is a suitable one; but the invention is not necessarily limited to it.

The relative electro-motive force of the storage-battery and outside circuit, as well as resistance of motors and circuits, will of course be adapted to the necessities of each case. For illustration, it may be assumed that the electro-motive force of the outside circuit is four hundred volts and that of the battery two hundred volts. It will be observed that since the motor C when connected with the outside circuit is always in circuit and in series with the battery a current will be running through the motor and through the storage-battery, the result being that the former is rotated and the latter charged. If, as above stated, the car is at rest, the motor C will be without any load and will revolve at a high speed. However, when an excessive amount of work is to be done by the motors, then they are fed both by current from the outside circuit and from the storage-battery, and when the battery is sufficiently charged the outside circuit may be disconnected and the motors run, as before stated, from the storage-battery only.

By employing an organization in which when the car is at rest the motor C is run without load at a high speed, on the starting of car this motor is at the height of its efficiency and acts to assist the other motor B in starting.

I claim as my invention—

1. The combination, substantially as set forth, with the two leads L+ and L−, of the constantly-rotating motor C and storage-battery connected between the leads, whereby the battery is charged, the motor B, adapted to be switched into circuit in starting the car or work to be done, and clutch mechanism, whereby the motor C may be coupled to assist the motor B, as set forth.

2. The combination, substantially as set forth, with the two leads, of a storage-battery connected between the leads, a constantly-rotating motor C, connected between one pole of the storage-battery and one of the leads, a motor B, connected between the same pole of the storage-battery and the opposite lead, switch devices, and clutch mechanism for joining the motors to work together.

3. The combination, substantially as set forth, with two leads, of an outside circuit, a storage-battery connected between said leads, a motor connected between one pole of the storage-battery and one of said leads, another motor connected between the same pole of the storage-battery and the other lead, an electro-magnetic clutch in the circuit of the second motor arranged to couple the motors, and switch mechanism for the circuits.

4. The combination, substantially as set forth, of the two leads of the outside circuit, a storage-battery connected between them, a motor C, connected between one pole of the storage-battery and one of the leads, a motor B, connected between the same pole of the storage-battery and the other lead, clutch mechanism between the armature-shafts of the two motors, a switch S, having the contact $s'$ and another contact or contacts $s$, a wire m, connecting one pole of the storage-battery with a contact s of said switch, and a switch S'.

5. The combination, substantially as set forth, of the two leads of an outside circuit, a storage-battery connected between said leads, a constantly-acting motor between one pole of the storage-battery and one of said leads, for the purpose described, a second motor, circuit-connections for including it in circuit, and clutch devices for throwing the constantly-acting motor into operation to assist the other motor in starting.

6. The combination, substantially as set forth, of an electric circuit, a constantly-acting motor connected therein and normally running without load, a second motor adapted to be connected in the circuit, mechanism to be driven by said motors, and clutch devices by which the constantly-revolving motor may be thrown into operation to assist the other motor, as described.

7. The combination, substantially as set forth, of the two motors B C and electro-magnetic-clutch mechanism included in the circuit of the motor B and adapted to lock the shafts of both motors for joint work, as described.

8. The combination, substantially as set forth, of the motors B C, having their armature-shafts arranged in alignment, a clutch-magnet E E', and its coil arranged upon the shaft of one of the motors, the armature $E^2$ for said magnet on the shaft of the other motor, and an electric circuit in which the coil of the clutch-magnet may be included.

In testimony whereof I have hereunto subscribed my name.

STANLEY C. C. CURRIE.

Witnesses:
WARREN G. GRIFFITH,
CHAS. E. MACHOLD.